United States Patent [19]

Braconier

[11] 4,288,083
[45] Sep. 8, 1981

[54] HYDRODYNAMIC SHAFT SEAL

[75] Inventor: Karl Braconier, Bridgewater, N.H.

[73] Assignee: International Packings Corporation, Bristol, N.H.

[21] Appl. No.: 119,297

[22] Filed: Feb. 7, 1980

[51] Int. Cl.³ .......................... F16J 15/32; F16J 15/40
[52] U.S. Cl. .................... 277/134; 277/153; 277/165
[58] Field of Search .......... 277/152, 153, 165, 207 R, 277/207 A, 75, 134

[56] References Cited

U.S. PATENT DOCUMENTS

| 3,534,969 | 10/1970 | Weinand | 277/134 X |
| 3,633,927 | 1/1972 | Van Deven | 277/134 |
| 3,913,925 | 10/1975 | Gyory | 277/75 |

FOREIGN PATENT DOCUMENTS

| 83614/75 | 4/1978 | Australia | 277/153 |
| 1941675 | 2/1971 | Fed. Rep. of Germany | 277/134 |
| 215407 | 9/1967 | Sweden | 277/134 |
| 1239873 | 7/1971 | United Kingdom | 277/134 |

*Primary Examiner*—Robert S. Ward, Jr.

[57] ABSTRACT

A hydrodynamic shaft seal for use under both static and dynamic conditions features a sealing face having one static sealing surface at the non-liquid side of the seal and a dynamic sealing surface having a plurality of angular vanes forming chambers open to the liquid at the liquid side of the seal. An annular coil spring biases the static sealing surface into contact with the shaft under static conditions and controls its spacing under dynamic conditions during which the vanes propel liquid toward the liquid side of the seal.

4 Claims, 3 Drawing Figures

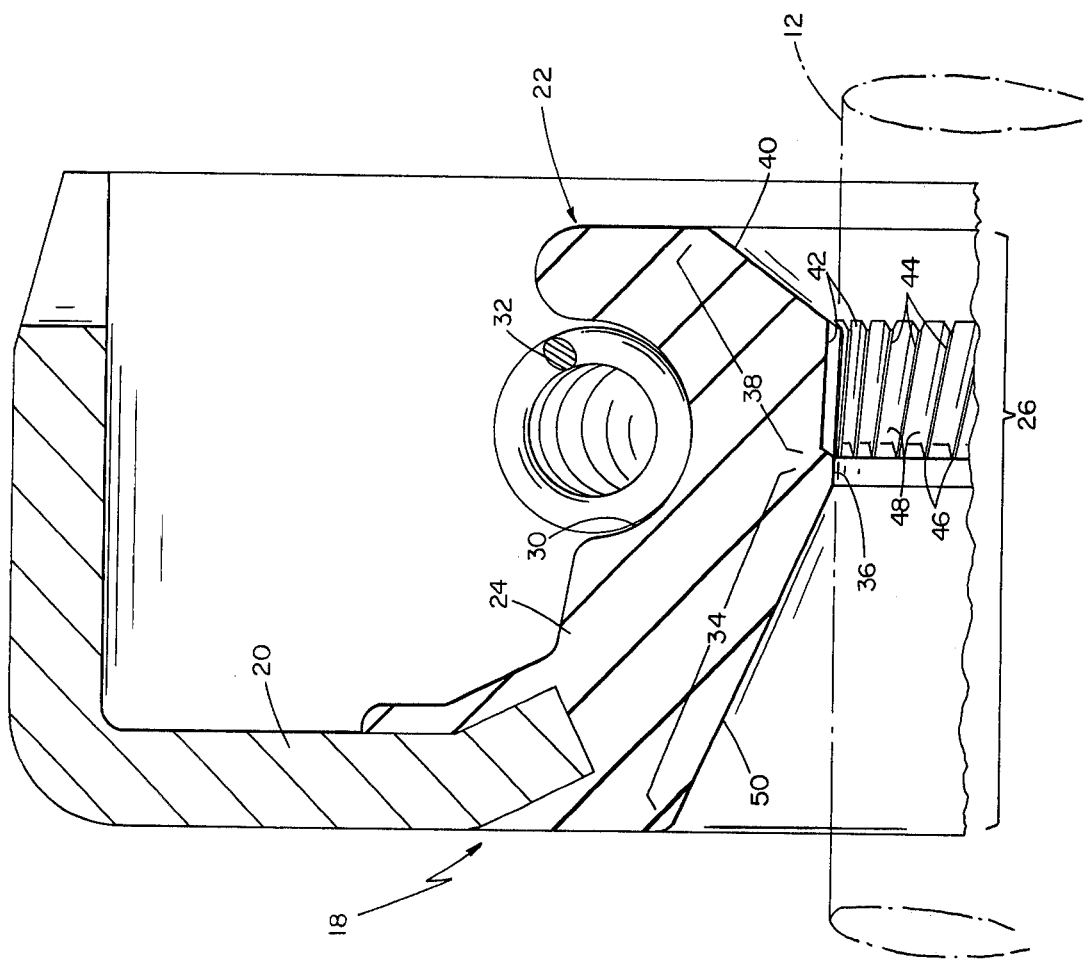
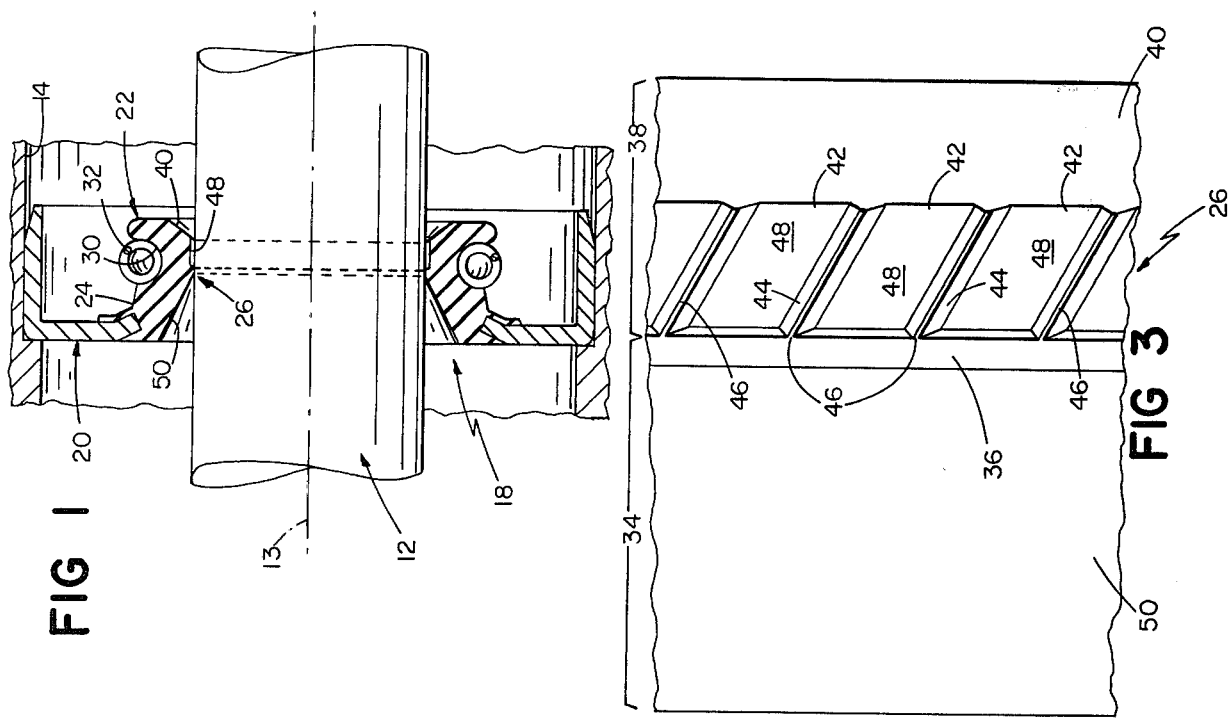

HYDRODYNAMIC SHAFT SEAL

This invention relates to hydrodynamic shaft seals for use under both static and dynamic conditions.

In Gyory, U.S. Pat. No. 3,913,925, there is shown and described a hydrodynamic lip seal having a primary static lip and a secondary static lip for preventing leakage of the liquid that lubricates the dynamic surface portion onto which the liquid is pumped through a plurality of feed holes through the seal wall. In addition, hydrodynamic impelling helices are provided on the air side of the seal for sealing in the liquid during dynamic conditions.

One disadvantage of such prior art is that it requires the use of two static sealing lips for sealing the liquid that lubricates the dynamic surface portion.

Another disadvantage is that it requires the use of feed holes for pumping the liquid into the dynamic surface portion.

A further disadvantage is that it requires the use of hydrodynamic impelling helices on the air side of the seal.

In view of such deficiencies in the prior art, it is a major object of the present invention to provide a novel hydrodynamic shaft seal having fewer and simpler operating elements.

It is another object of the present invention to provide a novel hydrodynamic shaft seal with but a single static sealing surface.

A further object of the present invention is to provide a novel hydrodynamic shaft seal which does not require feed holes to provide lubrication to the dynamic surface portion.

It is yet another object of the present invention to provide a novel hydrodynamic shaft seal with impelling vanes only at the dynamic sealing portion.

Accordingly, the present invention provides a novel shaft seal for use between a rotating shaft and a surrounding stationary housing under both static and dynamic conditions. It has an annular resilient seal body adapted to be fixed relative to the housing in a position encircling the shaft with an integral, radially inwardly extending, flexible inner portion terminating in a generally annular sealing face for sliding engagement with the periphery of the shaft and an outer, annular, spring-retaining groove located radially outwardly of the sealing face. An annular coil spring is mounted in the groove to provide a radially inwardly directed force biasing the sealing face radially inwardly toward the shaft.

The sealing face includes a continuous annular static portion with a narrow cylindrical static sealing surface for static sealing against the shaft, a dynamic portion adjacent the liquid side of the seal body, including an annular conical liquid side surface on the liquid side of the seal body, and an imperforate annular outer surface, preferably cylindrical, of greater diameter than that of the static sealing surface, spaced radially outwardly from the shaft and extending axially from the static sealing surface toward the liquid side of the seal body and intersecting the liquid side surface. The outer surface has a plurality of peripherally spaced vanes extending radially inwardly and extending axially at an angle to the axis of the seal body, the inner surfaces of the vanes forming an interrupted surface, preferably cylindrical with a diameter no less that that of the static sealing surface, so that the outer surface and the vanes forming chambers therebetween are open to the liquid side of the seal body.

The spring force is effective under static conditions to urge the static sealing surface into contact with the shaft to prevent escape of liquid from the liquid side along the shaft.

Under high speed dynamic conditions, the spring force is effective to balance the radially outwardly directed hydrodynamic force against the outer surface and maintain both the static sealing surface and the inner surfaces of the vanes spaced radially outwardly from the shaft and to control the spacing to prevent escape of liquid from the liquid side along the shaft.

Other objects, features, and advantages of the present invention will appear from the following detailed description of a preferred embodiment thereof, taken together with accompanying drawings, wherein:

FIG. 1 is a partial vertical cross sectional view of the shaft seal according to the present invention, mounted within a surrounding housing and with a shaft passing therethrough;

FIG. 2 is an enlarged partial vertical cross sectional view of the shaft seal shown in FIG. 1; and FIG. 3 is a developed view of the dynamic surface portion of the shaft seal shown in FIGS. 1 and 2.

Referring to the drawings, in general, the shaft seal of the present invention is mounted within a surrounding stationary housing 14 with a shaft 12 passing through it for use during both static and dynamic conditions.

More specifically, shaft seal 18 has an annular rigid case 20 and an annular resilient seal body 22 adapted to be fixed relative to housing 14 in a position encircling shaft 12. Resilient seal body 22 has a central axis 13 coincident with that of shaft 12 and comprises an integral, radially inwardly extending, flexible inner portion 24 terminating in a generally annular sealing face 26 for sliding engagement with the periphery of shaft 12. An annular conical liquid side surface 40 of seal body 24 is exposed to the liquid to be sealed against leakage.

An outer annular spring-retaining groove 30 is located radially outwardly of sealing face 26 and an annular coil spring 32 is mounted in groove 30 to provide a radially inwardly directed force biasing sealing face 26 radially inwardly toward shaft 12.

Referring to FIG. 2, sealing face 26 includes a continuous annular static portion 34 with a narrow cylindrical static sealing surface 36 adjacent the opposite side of seal body 22 for static sealing against shaft 12 and a dynamic portion 38 adjacent the liquid side of seal body 22. In addition to the liquid side surface 40 on the liquid side of seal body 22, dynamic portion 38 has an imperforate annular cylindrical outer surface 42 of greater diameter than that of static sealing surface 36. Imperforate outer surface 42 is spaced radially outwardly from shaft 12 and extends axially from static sealing surface 36 toward the liquid side of seal body 22 and intersects liquid side surface 40. Sealing face 26 also includes an annular conical opposite side surface 50 intersecting static sealing surface 36 on the opposite side of seal body 22.

Referring to FIG. 3, outer surface 42 has a plurality of peripherally spaced vanes 44 extending radially inwardly and extending axially at an angle to the axis of seal body 22, with inner surfaces 46 of vanes 44 forming an interrupted cylindrical surface having a diameter no less than that of static sealing surface 36. Outer surface 42 and vanes 44 form chambers 48 therebetween which are open to the liquid side of seal body 22.

In operation, during static conditions when shaft 12 is stationary, annular coil spring 32 exerts a spring force that biases static sealing surface 36 into contact with shaft 12 to prevent escape of liquid from the liquid side along shaft 12. However, chambers 48 are open to the liquid side and the liquid remains in chambers 48 for lubricating sealing surface 36 and inner surfaces 46 of vanes 44 during the initial phase of dynamic conditions.

During dynamic conditions when shaft 12 is rotating, the radially outwardly directed hydrodynamic force exerted on sealing face 26 by the liquid in chambers 48 causes static sealing surface 36 to lift off from shaft 12. Vanes 44 on dynamic portion 38 create an axially directed impelling force which prevents the liquid on the liquid side of seal body 22 from leaking past static portion 34.

Under high speed dynamic conditions, the spring force is effective to balance the radially outwardly directed hydrodynamic force against the outer surface and maintain both the static sealing surface 36 and the inner surfaces 46 of the vanes 44 spaced radially outwardly from the shaft 12 and to control the spacing to prevent escape of liquid from the liquid side along the shaft.

What is claimed is:

1. A shaft seal for use between a rotating shaft and a surrounding stationary housing under both static and dynamic conditions, said housing having an opening extending therethrough and receiving said shaft therein said shaft seal comprising an annular resilient seal body adapted to be fixed relatively to said housing in a position encircling said shaft said resilient seal body having a central axis coincident with that of said shaft and comprising an integral radially inwardly extending flexible inner portion terminating in a generally annular sealing face for sliding engagement with the periphery of said shaft, the liquid axial side of said seal body being exposed to a liquid to be sealed against leakage, and an outer annular spring-retaining groove located radially outwardly of said sealing face, and an annular coil spring mounted in said groove providing a radially inwardly directed force biasing said sealing face radially inwardly toward said shaft said sealing face including a continuous annular static portion with a narrow static sealing surface adjacent the other side of the seal for static sealing against said shaft, and a dynamic portion adjacent the liquid side of said seal body, including an annular liquid side surface on said liquid side of said seal body an imperforate annular outer surface of greater diameter than that of said static sealing surface, spaced radially outwardly from said shaft and extending axially from said static sealing surface toward said liquid side of said seal body and intersecting said liquid side surface, said outer surface having a plurality of peripherally spaced vanes extending radially inwardly and extending axially at an angle to the axis of said seal body, said outer surface and said vanes forming chambers therebetween open to said liquid side of said seal body, said spring force being effective under static conditions to urge said static sealing surface into contact with said shaft to prevent escape of liquid from said liquid side along said shaft, and being effective under high speed dynamic conditions to balance the radially outwardly directed hydrodynamic force against said outer surface and maintain both said static sealing surface and the inner surfaces of said vanes spaced radially outwardly from said shaft and to control said spacing to prevent escape of liquid from said liquid side along said shaft.

2. A shaft seal as claimed in claim 1, wherein the inner surfaces of said vanes form an interrupted cylindrical surface having a diameter no less than that of said static sealing surface.

3. A shaft seal as claimed in claim 1 or 2, wherein said sealing face annular outer surface is cylindrical.

4. A shaft seal as claimed in claim 1 or 2, wherein said sealing face includes an annular conical opposite side surface intersecting said static sealing surface on said opposite side of said seal body.

* * * * *